(12) United States Patent
Arora et al.

(10) Patent No.: US 12,093,979 B2
(45) Date of Patent: Sep. 17, 2024

(54) SYSTEMS AND METHODS FOR GENERATING REAL-TIME RECOMMENDATIONS

(71) Applicant: Walmart Apollo, LLC, Bentonville, AR (US)

(72) Inventors: Yokila Arora, Sunnyvale, CA (US); Gaoyang Wang, San Jose, CA (US); Shashank Kedia, Sunnyvale, CA (US); Shubham Gupta, Sunnyvale, CA (US); Aditya Mantha, San Jose, CA (US); Praveenkumar Kanumala, Newark, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 207 days.

(21) Appl. No.: 17/147,980

(22) Filed: Jan. 13, 2021

(65) Prior Publication Data

US 2022/0222706 A1 Jul. 14, 2022

(51) Int. Cl.
*G06Q 30/0251* (2023.01)
*G06Q 30/0601* (2023.01)

(52) U.S. Cl.
CPC ..... *G06Q 30/0256* (2013.01); *G06Q 30/0253* (2013.01); *G06Q 30/0631* (2013.01)

(58) Field of Classification Search
None
See application file for complete search history.

(56) References Cited

U.S. PATENT DOCUMENTS

| 10,861,077 B1 | 12/2020 | Liu et al. |
| 11,113,744 B2 | 9/2021 | Mantha et al. |

(Continued)

FOREIGN PATENT DOCUMENTS

| EP | 1176531 | 1/2002 |
| KR | 20030068553 | 8/2003 |

(Continued)

OTHER PUBLICATIONS

Jiaxi Tang et al. Personalized Top-N Sequential Recommendation via Convolutional Sequence Embedding. Eleventh ACM International Conference on Web Search and Data Mining (WSDM '18). Association for Computing Machinery, New York, NY, USA, 565-573. https://doi.org/10.1145/3159652.3159656 (Year: 2018).*

(Continued)

*Primary Examiner* — Katherine Kolosowski-Gager
(74) *Attorney, Agent, or Firm* — Morgan, Lewis & Bockius LLP; Manita Rawat

(57) ABSTRACT

This application relates to apparatus and methods for providing recommended items to advertise. In some examples, a computing device determines a first set of items for recommendation based on historical user data associated with a user, and a second set of items for recommendation based on real-time user session data for the user. The computing device may then determine a subset of the first set of items based on associated scores and a predetermined threshold number of first items that can be presented for optimal user interaction. The computing device may generate a set of item recommendations by combining the subset of the first set of items and at least one of the second set of items to present to the user as advertisements.

20 Claims, 6 Drawing Sheets

(56) References Cited

U.S. PATENT DOCUMENTS

| | | | |
|---|---|---|---|
| 2002/0143613 | A1 | 10/2002 | Hong et al. |
| 2002/0188527 | A1 | 12/2002 | Dillard et al. |
| 2006/0212362 | A1 | 9/2006 | Donsbach et al. |
| 2010/0191582 | A1* | 7/2010 | Dicker ............... G06Q 30/0631 705/26.1 |
| 2011/0035379 | A1 | 2/2011 | Chen et al. |
| 2014/0222506 | A1* | 8/2014 | Frazer .................... G06Q 30/02 705/7.29 |
| 2017/0090867 | A1* | 3/2017 | Lifar ......................... G06F 7/24 |
| 2017/0103050 | A9 | 4/2017 | Underwood et al. |
| 2017/0228810 | A1* | 8/2017 | Shang .................. G06Q 10/067 |
| 2020/0104898 | A1* | 4/2020 | Cui .................... G06Q 30/0643 |

FOREIGN PATENT DOCUMENTS

| | | |
|---|---|---|
| WO | 2000017793 | 3/2000 |
| WO | 2012170475 | 12/2012 |

OTHER PUBLICATIONS

Barkan et al., "Item2Vec: Neural Item Embedding for Collaborative Filtering," 2016 IEEE International Workshop on Machine Learning for Signal Processing, Sep. 13-16, 2016, pp. 1-6, DOI: 10.1109/MLSP.2016.7738886, https://ieeexplore.ieee.org/document/7738886, 2016.

Grbovic et al., "E-Commerce in Your Inbox: Product Recommendations at Scale," Proceedings of the 21st ACCM SIGKDD International Conference on Knowledge Discovery and Data Mining (KDD 2015), arXiv:1606.07154v1 [cs.AI], Jun. 23, 2016, pp. 1-10, https://arxiv.org/abs/1606.07154, 2016.

Mantha et al., "A Large-Scale Deep Architecture for Personalized Grocery Basket Recommendations," arXiv:1910.12757v2 [cs.IR], Nov. 13, 2019, pp. 1-5, https://arxiv.org/abs/1910.12757, 2019.

Hu et al., "Collaborative Filtering for Implicit Feedback Datasets," ICDM '08: Proceedings of the 2008 Eighth IEEE International Conference on Data Mining, Dec. 2008, vol. 1, pp. 263-272, https://doi.org/10.1109/ICDM.2008.22, 2008.

Wan et al., "Representing and Recommending Shopping Baskets with Complementarity, Compatibility and Loyalty," Proceedings of the 27th ACM International Conference on Information and Knowledge Management, pp. 1133-1142, Oct. 2018, https://doi.org/10.1145/3269206.3271786, 2018.

Liang et al., "Factorization Meets the Item Embedding: Regularizing Matrix Factorization with Item Co-Occurrence," RecSys '16: Proceedings of the 10th ACM Conference on Recommender Systems, Sep. 15-19, 2016, pp. 59-66, https://doi.org/10.1145/2959100.2959182, 2016.

Dong et al., "metapath2vec: Scalable Representation Learning for Heterogeneous Networks," KDD '17: Proceedings of the 23rd ACM SIGKDD International Conference on Knowledge Discovery and Data Mining, Aug. 2017, pp. 135-144, https://doi.org/10.1145/3097983.3098036, 2017.

Linden et al., "Amazon. com Recommendations: Item-to-Item Collaborative Filtering," IEEE Internet Computing, vol. 7, No. 1, pp. 76-80, Jan. 2003, https://doi.org/10.1109/MIC.2003.1167344, 2003.

Le et al., "Basket-Sensitive Personalized Item Recommendation," Proceedings of the 26th International Joint Conference on Artificial Intelligence (IJCAI), Aug. 2017, pp. 2060-2066, https://dl.acm.org/doi/10.5555/3172077.3172174, 2017.

Mikolov et al., "Distributed Representations of Words and Phrases and Their Compositionality," Advances in Neural Information Processing Systems, arXiv:1310.4546v1 [cs.CL], Oct. 16, 2013, pp. 1-9, https://arxiv.org/abs/1310.4546, 2013.

Mikolov et al., "Efficient Estimation of Word Representations in Vector Space," arXiv preprint, arXiv:1301.3781v3 [cs.CL], Sep. 7, 2013, pp. 1-12, https://arxiv.org/abs/1301.3781, 2013.

Trofimov, "Inferring Complementary Products from Baskets and Browsing Sessions," arXiv preprint, arXiv:1809.09621v1 [cs.IR], Sep. 25, 2018, pp. 1-8, https://arxiv.org/abs/1809.09621, 2018.

Veit et al., "Learning Visual Clothing Style with Heterogeneous Dyadic Co-Occurrences," Proceedings of the 2015 IEEE International Conference on Computer Vision (ICCV), Dec. 7-13, 2015, pp. 4642-4650, https://doi.org/10.1109/ICCV.2015.527, 2015.

Zhang et al., "Quality-Aware Neural Complementary Item Recommendation," RecSys '18: Proceedings of the 12th ACM Conference on Recommender Systems, Sep. 2018, pp. 77-85, https://doi.org/10.1145/3240323.3240368, 2018.

Kang et al., "Complete the Look: Scene-Based Complementary Product Recommendation," 2019 IEEE/CVF Conference on Computer Vision and Pattern Recognition (CVPR), Jun. 15-20, 2019, pp. 10524-10533, doi: 10.1109/CVPR.2019.01078, https://doi.org/10.1109/CVPR.2019.01078, 2019.

Xu et al., "Modeling Complementary Products and Customer Preferences with Context Knowledge for Online Recommendation," arXiv:1904.12574v1 [cs.IR], Mar. 16, 2019, https://arxiv.org/abs/1904.12574v1, 2019.

McAuley et al., "Inferring Networks of Substitutable and Complementary Products," KDD '15: Proceedings of the 21st ACM SIGKDD International Conference on Knowledge Discovery and Data Mining, Aug. 10-13, 2015, pp. 785-794, https://doi.org/10.1145/2783258.2783381, 2015.

Mane et al., "Complementary-Similarity Learning Using Quadruplet Network," arXiv preprint, arXiv:1908.09928v2 [cs.LG], Sep. 14, 2019, https://arxiv.org/abs/1908.09928, 2019.

Abadi et al., "TensorFlow: A System for Large-Scale Machine Learning," 12th USENIX Symposium on Operating Systems Design and Implementation (OSDI '16), Nov. 2-4, 2016, pp. 265-283, https://www.usenix.org/conference/osdi16/technical-sessions/presentation/abadi, 2016.

Johnson et al., "Billion-Scale Similarity Search with GPUs," arXiv preprint, arXiv:1702.08734v1 [cs.CV], Feb. 28, 2017, https://arxiv.org/abs/1702.08734, 2017.

ANNOY library, https://github.com/spotify/annoy, accessed Jun. 18, 2020.

Naidan et al., "Non-Metric Space Library (NMSLIB) Manual," arXiv: 1508.05470v4 (cs.MS], Jun. 7, 2019, https://arxiv.org/pdf/1508.05470.pdf, 2019.

Boytsov et al., "Engineering Efficient and Effective Non-Metric Space Library," SISAP 2013: Proceedings of the 6th International Conference on Similarity Search and Applications, vol. 8199, pp. 280-293, Oct. 2013, https://doi.org/10.1007/978-3-642-41062-8_28, 2013.

"The Instacart Online Grocery Shopping Dataset 2017," https://www.instacart.com/ datasets/grocery-shopping-2017, accessed Jun. 18, 2020.

Walmart, "Grocery Home Shopping," http://grocery.walmart.com/, accessed Jun. 18, 2020.

Eclipse Deeplearning4j Development Team, "Deep Learning for Java: Open-Source Distributed Deep Learning for the JVM," Apache Software Foundation License 2.0., http://deeplearning4j.org, accessed Jun. 18, 2020.

Yuanyuan, "Talk about the recommendation system of e-commerce platform through Jingdong 618: penetrate each link and shoulder the responsibility of building platform ecology", p. 1-9.

Simon, "Your Shopping Cart just got a whole lot Smarter, this festive season", 2019, p. 1-7.

J. S. Reboholz, "Alibaba Does AI," Design: Retail, vol. 31, No. 1, Retrieved from https://dialog.proquest.com/professional/docview/21736399235?accountid=1314444, Jan./Feb. 2019, 1 page.

* cited by examiner

SYSTEMS AND METHODS FOR GENERATING REAL-TIME RECOMMENDATIONS

TECHNICAL FIELD

The disclosure relates generally to digital item advertisements and, more specifically, to electronically generating item advertisement recommendations that are based on balancing between past transactions and current user session.

BACKGROUND

At least some websites, such as retailer websites, display item advertisements to customers. For example, the website may provide item advertisements for the customer to view on the website's homepage. The item advertisements may include an image of an item, and a price of the item, for example. The website may further allow the customer to purchase the advertised items. In some examples, item advertisement systems may generate the item advertisements based on algorithms, such as machine learning algorithms, that operate on historical data, such as a customer's previous purchase history. The algorithms may generate the item advertisements in advance of the customer visiting the website (e.g., offline). For example, item advertisement systems may train and run inference on machine learning models offline using historical data to determine item advertisements to be displayed to a customer the next time the customer visits a website. In other examples, item advertisement systems may generate the item advertisements based on a perceived intent to shop for a type or category of item for the user session based on the user's interactions with the website during that particular session.

However, in both examples, the item advertisements may not be relevant to the customer visiting the website. For example, for an item advertisement system that uses only historical data to generate item advertisements, the customer may visit the website with an intent to shop for one type of product, but may be shown item advertisements for a different type of product. Similarly, in examples where an item advertisement system uses only perceived user intent for the current user session, the customer may be looking for a simpler way to find previously purchased items which the user may have forgotten to check for during the current session. In both examples, because the customer may not be interested in an advertised item, the customer may decide not to purchase the advertised item. As a result, a retailer may lose sales of items to a customer. For example, the customer may leave the website without having purchased an item that, if shown an advertisement for, the customer would have purchased. In some examples, if a customer perceives an item advertisement as irrelevant, the customer may go elsewhere, such as another website, to purchase an item that is relevant to the customer. As such, there are opportunities to improve the determination and generation of item advertisements that takes into account and balances both perceived user intent for a current session and the user's historical practices (e.g., historical purchases, historical interactions).

SUMMARY

The embodiments described herein are directed to automatically generating item recommendations for digital item advertisements that may be displayed, for example, on a website. The embodiments may allow a person, such as a customer, to be presented with advertisements of items (e.g., products and services) that are more relevant to (e.g., likely to interest) the person based on historical user data and current user session.

For example, the embodiments may allow for real-time inferencing of machine learning models (e.g., algorithms) to generate the item recommendations. For example, the machine learning models may operate on real-time data, such as data identifying real-time user events on a website, in conjunction with historical user data, such as historical purchase data, historical interaction data, to generate and provide item recommendations for digital item advertisements to display to the customer. The machine learning models may also operate on temporal data that may identify a current date (e.g., a date range), a current season (e.g., shopping season), and trend data that may identify current events (e.g., local current events) such as sporting events, festivals, weather changes, seasonal changes, or natural disasters, for example. Among other advantages, the embodiments may allow for the generation of item recommendations that are more relevant to a customer. For example, the item recommendations may be based, at least in part, on real-time customer interactions and past interactions with a website. As such, the embodiments may leverage the intent of customers as they land on a website, changing micro-intents as they navigate through the website, as well as constant user intents (e.g., habits) as they have historically interacted with items on the website.

Further, the embodiments may leverage previously generated (e.g., prior to current user session) or pre-trained feature embeddings associating (e.g., ranking) items frequently brought or interacted with by a user during past user sessions in a feature space. The embodiments may also leverage previously generated feature embeddings associating items with potential intents in another feature space. The two embeddings may then be used in real-time to determine item recommendations based on perceived user intent and user habits (e.g., past transaction, past interactions). As such, the embodiments may satisfy timing requirements associated with providing item recommendations. For example, the embodiments may generate and provide item recommendations for digital item advertisements to be displayed to a customer in real-time.

In some examples, a computing device determines a first set of potential items based on a user data (e.g., historical user transaction data, historical user interaction data). The computing device may receive session data associated with a current user session including user's engagement with second items. The computing device may then determine a second set of potential items based on the user's engagement with the second items. Further, the computing device may determine one or more item recommendations based on the first set of items and the second set of items, the one or more item recommendations including at least one item of the first set of items and at least one item of the second set of items. The computing device may transmit the one or more item recommendations for presentation to the user.

In some embodiments, the computing device is configured to receive the user session data identifying website activities of a user from a web server, and to generate feature data based on at least the user session data for the user. Further, the computing device is configured to determine the second set of items based on the feature data. The computing device is also configured to receive historical user purchase data to process, determine, and/or rank the first set of items as favorite items of the user based on the items being previously purchased or engaged with by the user during previous user sessions. In some embodiments, the one or more item recommendations may include a threshold number of items from the first set of items and at least one items from the second set of items. The threshold may be based on a diminishing probability of the user interacting with an item in the first set of items after a particular rank. The processing unit is further configured to transmit the item recommendations to the user.

In some embodiments, a method includes determining a first set of potential items based on a user data (e.g., historical user transaction data, historical user interaction data). The method may also include receiving session data associated with a current user session including user's engagement with second items. The method may then include determining a second set of potential items based on the user's engagement with the second items. Further, the method may include determining one or more item recommendations based on the first set of items and the second set of items, the one or more item recommendations including at least one item of the first set of items and at least one item of the second set of items. The method may also include transmitting the one or more item recommendations for presentation to the user.

In yet other embodiments, a non-transitory computer readable medium has instructions stored thereon, where the instructions, when executed by at least one processor, cause a computing device to perform operations that include determining a first set of potential items based on a user data (e.g., historical user transaction data, historical user interaction data). The operations may also include receiving session data associated with a current user session including user's engagement with second items. The operations may then include determining a second set of potential items based on the user's engagement with the second items. Further, the operations may include determining one or more item recommendations based on the first set of items and the second set of items, the one or more item recommendations including at least one item of the first set of items and at least one item of the second set of items. The operations may also include transmitting the one or more recommendations for presentation to the user.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
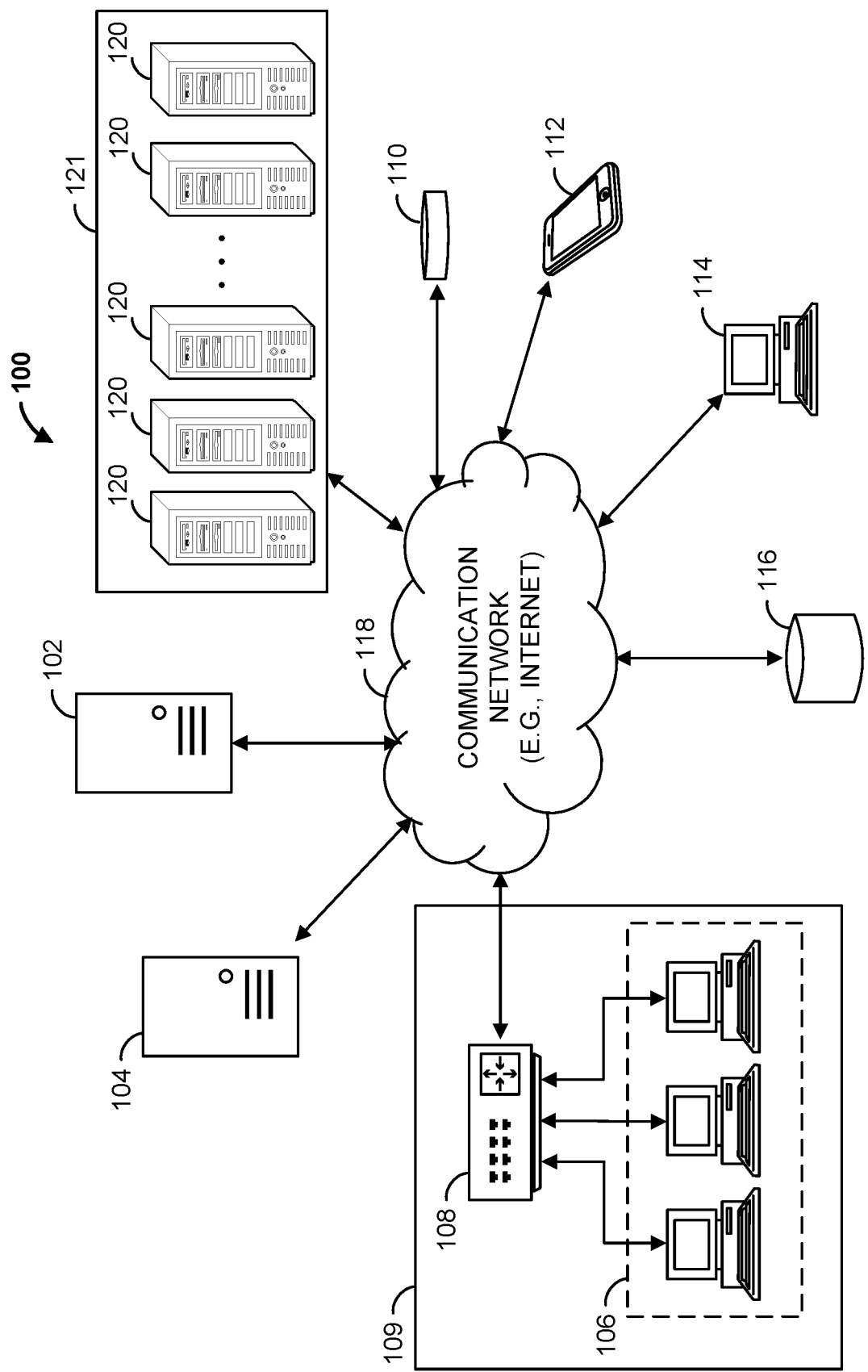
FIG. 1 is a block diagram of an item recommendation system that includes an item recommendation computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item recommendation system 100 that includes an item recommendation computing device 102 (e.g., a server, such as an application server), a web server 104, one or more processing devices 120, workstation(s) 106, database 116, and one or more customer computing devices 110, 112, 114 operatively coupled over network 118. Item recommendation computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of item recommendation computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to item recommendation computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, item recommendation computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with item recommendation computing device 102 over communication network 118. The workstation(s) 106 may send data to, and receive data from, item recommendation computing device 102. For example, the workstation(s) 106 may transmit data identifying items purchased by a customer at store 109 to item recommendation computing device 102.

Although FIG. 1 illustrates three customer computing devices 110, 112, 114, item recommendation system 100 can include any number of customer computing devices 110, 112, 114. Similarly, item recommendation system 100 can include any number of item recommendation computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view item advertisements for items displayed on the website, and may click on item advertisements, for example. The website may capture these activities as user session data, and transmit the user session data to item recommendation computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to item recommendation computing device 102.

In some examples, item recommendation computing device 102 may execute one or more models (e.g., algorithms), such as a machine learning model, statistical model, etc., to determine recommended items to advertise to the customer (i.e., item recommendations). Item recommendation computing device 102 may transmit the item recommendations to web server 104 over communication network 118, and web server 104 may display advertisements for one or more of the recommended items on the website to the customer. For example, web server 104 may display the item advertisements to the customer on a homepage, a catalog webpage, an item webpage, or a search results webpage of the website (e.g., as the customer browses those respective webpages).

In some examples, web server 104 transmits a search request to item recommendation computing device 102. The search request may identify a search query provided by the customer (e.g., via a search bar of the web browser), or a recommendation query provided by a processing unit in response to user adding one or more items to cart or interacting (e.g., engaging) with one or more items. In response to receiving the request, item recommendation computing device 102 may execute the one or more processors to determine search results to display to the customer (i.e., item recommendations). Item recommendation computing device 102 may transmit search results to web server 104 over communication network 118. Web server 104 may display the search results on a search results webpage, for example.

Item recommendation computing device 102 is further operable to communicate with database 116 over communication network 118. For example, item recommendation computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item recommendation computing device 102, in some examples, database 116 can be a local storage device, such as a hard drive, a non-volatile memory, or a USB stick. Item recommendation computing device 102 may store purchase data received from web server 104 in database 116. Item recommendation computing device 102 may also receive from web server 104 user session data identifying events associated with browsing sessions, and may store the user session data in database 116.

In some examples, item recommendation computing device 102 generates feature vectors for a plurality of models (e.g., machine learning models, statistical models, algorithms, etc.) based on historical user session data, purchase data, and current user session data for the user. Item recommendation computing device 102 trains the models based on their corresponding feature vectors, and item recommendation computing device 102 stores the models in a database, such as in database 116 (e.g., cloud storage).

The models, when executed by item recommendation computing device 102, allow item recommendation computing device 102 to determine item recommendations for one or more items to advertise to a customer. For example, item recommendation computing device 102 may obtain the models from database 116. Item recommendation computing device 102 may then receive, in real-time from web server 104, current user session data identifying real-time events of the customer interacting with a website (e.g., during a browsing session). In response to receiving the user session data, item recommendation computing device 102 may execute the models to determine item recommendations for items to display to the customer.

In some examples, item recommendation computing device 102 receives current user session data from web server 104. The user session data may identify actions (e.g., activity) of the customer on a website. For example, the user session data may identify item impressions, item clicks, items added to an online shopping cart, conversions, click-through rates, advertisements viewed, and/or advertisements clicked during an ongoing browsing session (e.g., the user data identifies real-time events). Item recommendation computing device 102 may generate item recommendations based on the user session data and historical user data (e.g., historical user transaction data, historical user engagement data). For example, item recommendation computing device 102 may determine one or more perceived user intents for the current user session based on an ordered list of items the user interacted (e.g., engaged) with in real-time. In some examples, item recommendation computing device 102 may determine a ranked list of items for recommendation based on the items the user interacted with during the current user session. Item recommendation computing device 102 may also determine an initial ranked list of items for recommendation based on the historical user data. In some examples, the initial ranked list of items may include items ranked based on the historical user data with the items already added to the cart by the user during the current user session. Further, item recommendation computing device 102 may re-rank the initial ranked items based on the ordered list of items. For example, item recommendation computing device 102 may determine re-ranked list of items for recommendation based on context of the current user session using a pre-trained model trained using tensors (e.g., embedding vectors, feature vectors) of user and items based on historical user data.

In some examples, the tensors are generated based on historical session data for the customer. For example, item recommendation computing device 102 may generate the tensors based on user session data for the ongoing browsing session, and historical session data and/or historical purchase data for the customer. In some examples, the tensors are generated on temporal data (e.g., a current date (e.g., a date range), a current season (e.g., shopping season) and/or trend data (e.g., current events, sporting events, festivals, weather changes, seasonal changes, natural disasters, etc.). For example, item recommendation computing device 102 may generate the tensors based on user session data for the ongoing browsing session, and the trend data. In some examples, item recommendation computing device 102 generates the tensors based on user session data for the ongoing browsing session, historical session data for the customer, and trend data.

Item recommendation computing device 102 may provide the tensors (e.g., embeddings) as required by each machine learning model. The machine learning models may include, for example, neural networks, deep neural networks, decision tree models, regression models, random forest models, statistical models, stochastic models, or any other suitable models.

In some examples, item recommendation computing device 102 assigns the models (or parts thereof) for execution to one or more processing devices 120. For example, each model may be assign to a virtual machine hosted by a processing device 120. The virtual machine may cause the models or parts thereof to execute on one or more processing units such as GPUs. In some examples, the virtual machines assign each model (or part thereof) among a plurality of processing units.

Based on the output of the models, item recommendation computing device 102 may generate item recommendations for items to be advertised on the website. For example, item recommendation computing device 102 may transmit the item recommendations to web server 104, and web server 104 may display the recommend items to the customer.

In some examples, item recommendation computing device 102 may rank items for recommendation based the expected gross value of each of the items. For example, gross value of an item may be dependent on relevancy of the item to the user, the user session, and the position that the item is shown in the recommendations. A highly relevant item shown at a position that the user is unlikely to scroll to may not result in sale of the item. The gross value may indicate a probability of the user purchasing and/or interacting with the item at a given position and given the one or more perceived user intents based on the current user session.

In some examples, optimizing the gross value of the recommended item, items for recommendation may be selected from a first set of ranked items based on the historical user data and a second set of ranked items based on the current user session. In some examples, the expected gross value for an item, i, shown at position, j, for items in both the first and the second set, the gross value may be optimized as follows:

$$\text{maximize } \Sigma_{j=1}^{n} \pi_{ij} x_{ij} \qquad \text{eq. 1}$$

$$\text{subject to } x_{ij} \in \{0,1\}$$

$$\forall j, \Sigma_i x_{ij} = 1$$

where $\pi_{ij}$ represents an expected gross value of presenting item item, i, shown at position, j, n represents the number pf possible positions to show recommendations, and $x_{ij}=1$ if the item $i \in f1 \cup f2$ is selected to be shown at position j, else $x_{ij}=0$, where $f1$ includes the first set of ranked items and $f2$ includes the second set of ranked items. Overall gross value may be determined for all times at all positions (e.g., all possible ways of placing items for recommendation), for all possible position to show all items in first and second set of ranked items. However, such optimization may be computationally expensive to perform in real-time due to the amount of data and calculations to be performed optimally, especially since the above integer linear programming problem as well as calculation of all possible for all items at all positions.

In some examples, item recommendation computing device 102 may assume that recommending items based on historical user data (e.g., first set of items) leads to higher overall gross value than recommending items purely based on current user session (e.g., second set of items). As such, relevant items from the first set of items may be shown in favorable positions prior to the items in the second set of items. In some examples, item recommendation computing device 102 may determine threshold the number of items from the first set of items to recommend based on an opportunity cost of showing another item from the first set of items starts flying diminishing returns. The threshold, k, may be determined as follows:

$$\text{if } x_{ij}=1 \text{ and } i \in f_1, j \leq k \qquad \text{eq. 2}$$

$$\text{if } x_{ij}=1 \text{ and } i \in f_2, j < k \qquad \text{eq. 3}$$

Next, item recommendation computing device 102 may determine complimentary items to items in the first set of items after thresholding based on the current user session (e.g., from the second set of items) and provide those as recommendations before the rest of the items in the first set of items (as ranked). In this way, the two steps may be tractable and provide inference with low latency in real-time.

Determining First Set of Items

In some examples, item recommendation computing device 102 may determine first set of items (e.g., user favorites) based on historical user data, including user transaction data, and/or user engagement data. Any known ranking model may be used to generate the first set of items based on the historical user data. A learning to rank framework may be used to optimize the ranking of the items. Ranking model may optimize the likelihood of the user buying an item in the first set compared to another item in the first set of items. The favorites ranking model may determine a pairwise preference between two items, $i_k$ and $i_l$, based on corresponding scores, $v_k$ and $v_l$ (e.g., determined based on historical user data), assigned to the items as follows:

$$P(\text{user buys } i_k \text{ vs. } i_1) = \frac{1}{1 + e^{-(f(v_k) - f(v_l))}} \qquad \text{eq. 4}$$

where $f$ is a transformation function. In some examples, item recommendation computing device 102 may assume that ranking accuracy may be more important at the beginning of the list (e.g., ranked order) when determining items for recommendations compared to later in the list. The probability estimates may be more accurate at the beginning of the list. For example, predicting the likelihood of the user buying item $i_1$ over item $i_2$ may be more accurate than the likelihood to buy item $i_{10}$ over item $i_{11}$. As such, the transformation function, $f$, may be a logit function. The scores or predictions may be used to determined the first set of ranked items (e.g., ranked favorites). In some examples, items already in the user's cart during the current user session may be removed from the first set of ranked items.

Thresholding First Set of Items

In some examples, item recommendation computing device 102 may determine a threshold number of items to be recommended from the first set of ranked items. The threshold number of items, k, from the first set of items may be determined such that the opportunity cost of showing another item from the first set of items after the threshold number provides diminishing returns on gross values. For example, a first set of ranked items (e.g., items 1 to N) for the user with their corresponding scores ($v_1$ to $v_N$), may be represented by:

$$[(i_1, v_1), (i_2, v_2), \ldots, (i_k, v_k), \ldots, (i_N, v_N)] \text{ such that}$$
$$v_1 > v_2 > \ldots > v_N \qquad \text{eq. 5}$$

where N is the number of items in the first set of ranked items. In some examples, the favorites ranking model may determine the probability of the user buying item, $i_k$, vs. item $i_1$, as follows:

$$P(\text{User buys } i_k \text{ vs. } i_1) = \sigma(logit(v_k) - logit(v_1)) \qquad \text{eq. 6}$$

where $$\sigma(x) = \frac{1}{1 + e^{-x}} \qquad \text{eq. 7}$$

$$logit(x) = \log\left(\frac{x}{1-x}\right) \text{ where } x \in (0, 1) \qquad \text{eq. 8}$$

$$logit(\sigma(x)) = \sigma(logit(x)) = x \qquad \text{eq. 9}$$

Item recommendation computing device 102 may optimize the likelihood of a user buying an item at position k compared to position 1 and the items in the first set of ranked items may then be filtered based on probabilities of items in the first set being below a predetermined threshold, t, as follows:

$$P(\text{User buys } i_k \text{ vs. } i_1) > t \qquad \text{eq. 10}$$

In some examples, a thresholding model may be used to optimize for real-time thresholding determinations, where the model may determine the above logits to be calculated for equation 10 as follows:

$$\sigma(logit(v_k) - logit(v_1)) > t \qquad \text{eq. 11}$$

where $$logit(v_k) - logit(v_1) > logit(t) \qquad \text{eq. 12}$$

as such, $$logit(v_k) > logit(v_1) + logit(t) \qquad \text{eq. 13}$$

Item recommendation computing device 102 may sequentially go through the first set of ranked items till the condition in equation 13 holds. For items in the first set of ranked items after the position k where the condition 13 stops holding, item recommendation computing device 102 may remove those items from the first set of ranked items to generate the remaining first set of ranked items post thresholding.

In some examples, item recommendation computing device 102 may determine that the logit function is numerically unstable. For such examples, to handle edge cases, the thresholding model may calculate the logit functions for above equations as follows:

$$logit(s) = \begin{cases} -10 & \text{if } x < 0.0001 \\ 10.0 & \text{if } x > 0.9999 \\ \log\left(\frac{x}{1-x}\right) & \text{otherwise} \end{cases} \qquad \text{eq. 14}$$

In some examples, item recommendation computing device 102 may optimize the threshold, t, to increase the add to cart statistic. Historical user data (e.g., historical user interactions, historical purchase data) may be used to determine a number of items were displayed to a user as compared to the number of items that were bought (e.g., precision calculation). Using historical data for all users, an average precision and average number of items displayed may be determined for a given threshold. Item recommendation computing device 102 may leverage the assumption that average precision decreases as more items are displayed as recommendations. As such, an average add to cart statistic may be computed as follows:

$$\text{avg. ATC} = \text{avg. items displayed} \times \text{avg. precision} \qquad \text{eq. 15}$$

The predetermined threshold may then be determined such at average add to cart (i.e., avg. ATC) per item displayed for recommendation is maximized. Further, it should be understood that the predetermined threshold may be different for different cart sizes. Item recommendation computing device 102 may also determine the predetermined threshold, in some cases, based on assumption that a larger number of items in the cart, the higher likelihood of the user already having explored (e.g., engaged with, interacted with) items that are the user's favorites (e.g., first set of ranked items). As such the threshold may be lower when the user's cart has more items than less, as the user may be more likely to explore other items that are of the type or category of items in the cart of the current user session.

Determining Second Set of Items

In some examples, item recommendation computing device 102 may determine a second set of ranked items based on the current user session. For example, user's selections (e.g., add to carts) and/or interactions with items during the current user session in real-time may be used to determine one or more user intents for the user session. For example, a user's selection of items may be associated with multiple user intents. As an example, user's intent for the current user session may be buying baking hoods and house cleaning supplies. For examples, a user's selection of sugar, egg, flour, and bread during a user session may indicate a user intent to bake a cake. As such, in that example, milk may be an item to recommend in the second set of items that may be based on the current user session. The second set of items may be ranked based on a corresponding likelihood of the user buying the item given other items selected by the user during the current user session.

In some examples, a context model may be used to determine the second set of ranked items. Pre-trained user and item embeddings may be used for ranking the first set of items based on the current user session. The context model may be trained based on historical user data (e.g., historical user purchase data) indicating items bought by the user during a corresponding past user session. Items bought together may be represented as a triplet (i, j, u), with items i, j being purchased by user, u, during the same past user session. Set of all possible triplets may then be denoted by T. The embeddings for users, h, and item pairs (p, q), as triplets may then be generated based on a cohesion score, $s_{i,j,u}$, and softmax probability $$P(i \mid j, u) = \frac{\exp(s_{i,j,u})}{\Sigma_{i'} \exp(s_{i',j,u})}$$

determined as follows:

$$s_{i,j,u} = p_i^T q_j + p_i^T h_u + q_j^T h_u \quad \text{eq. 16}$$

$$P(i \mid j, u) = \frac{\exp(s_{i,j,u})}{\sum_{i'} \exp(s_{i',j,u})} \quad \text{eq. 17}$$

Context model may optimize the occurrence-likelihood, $\mathcal{L}$, of the triplet to learn the user-item embeddings using the loss functions as follows:

$$\mathcal{L} = \Sigma_{(i,j,u) \in T} (\log p(i|j,u) + \log P(j|i,u) + \log P(u|i,j)) \quad \text{eq. 18}$$

It should be noted that any known embedding based framework or algorithm may be used to embed the user-item embeddings based on the historical user data.

In some examples, context model may be trained by randomly initializing dual embeddings (p, q) and user embeddings u from a uniform distribution of [0.01, 0.01]. An adaptive moment estimation optimizer may be used, in some examples, such as a slight variation of stochastic gradient descent, to train the context model using the follows:

$$m_w^{(t+1)} \leftarrow \beta_1 m_w^{(t)} + (1 - \beta_1) \nabla_w L^{(t)} \quad \text{eq. 19}$$

$$v_w^{(t+1)} \leftarrow \beta_2 v_w^{(t)} + (1 - \beta_2)(\nabla_w L^{(t)})^2 \quad \text{eq. 20}$$

$$\hat{m}_w = \frac{m_w^{(t+1)}}{1 - (\beta_1)^{t+1}} \quad \text{eq. 21}$$

$$\hat{v}_w = \frac{v_w^{(t+1)}}{1 - (\beta_2)^{t+1}} \quad \text{eq. 22}$$

-continued $$w^{(t+1)} \leftarrow w^{(t)} - \eta \frac{\hat{m}_w}{\sqrt{\hat{v}_w} + \epsilon} \quad \text{eq. 23}$$

where w represents the parameters of the context model, $\mathcal{L}$ represents the loss function, $\beta_1$ and $\beta_2$ represent the forgetting factors for gradients and second moments of gradients, n represents the learning rate, and $\nabla_w L$ represents the gradient of the loss function with respect to the parameters of the model. In some examples, the context model may be trained end to end for a maximum of hundred epochs with 500M triplets. In some examples, item recommendation computing device 102 may initialize the embeddings (e.g., 128 dimensional embeddings), (p, q, and h), prior to using the adaptive moment estimation optimizer to update the embedding values.

In some examples, the first set of ranked items may be re-ranked using the context model to generate third set of ranked items. For example, for a list of n items selected by the user, $C = \{c_1, c_2, \ldots, c_n\}$, and the first set of ranked items denoted by $F = \{f_1, f_2, \ldots, f_n\}$, (e.g., form items after thresholding), it may be determined that the items in the first set of ranked items with the highest cohesion score according to equation 16 may be the re-ranked as the highest ranked items. The first set of ranked items may then be re-ranked as one of the aggregate, summation, and/or max aggregation functions as follows:

$$\arg \mathrm{sort}_{\forall j \in f} = \{\mathrm{Aggregate}(p_i^T q_j + p_i^T h^u + h_u^T q_j) : \forall i \in C\} \quad \text{eq. 24}$$

$$\arg \mathrm{sort}_{\forall j \in f} = (\Sigma_{\forall j \in f} (p_i^T q_j + p_i^T h_u + h_u^T q_j)) \quad \text{eq. 25}$$

$$\arg \mathrm{sort}_{\forall j \in f} = \{\max(p_i^T q_j + p_i^T h_u^T + h_u^T q_j) : \forall i \in C\} \quad \text{eq. 26}$$

where $p_i$ represents the item embedding of item i, $q_j$ represents the item embedding of item j in the dual space, and $h_u$ represents the user embedding of user u. The re-ranked first set of items may be presented to the user as item recommendations in the positions 1 to k, and the top ranked second set of ranked items may be presented as recommendations from positions k+1 to the total number of possible positions for recommendations.

In some examples, item recommendation computing device 102 may generate item recommendations for a customer based on first set of ranked items after thresholding and at least a portion of the second set of items.

Among other advantages, the embodiments allow for real-time inferencing of multiple models to generate item recommendations for a particular customer based on perceived user intent from current user session (e.g., user engagement data, interaction data, add to carts, clicks, search queries) and historical user data (e.g., purchase data, transaction data, engagement data). Distributing processing tasks prior to the current session, based on previously trained and saved embeddings, allows for more consistent throughput consistency, as well as a reduction in overall processing time. Moreover, the distribution of processing tasks allows for the use of more computationally intensive models, such as neural networks, which can capture non-linear relationships from trained data and may be better suited to estimate relationships on unseen data (e.g., real-time data).

Figure 2:
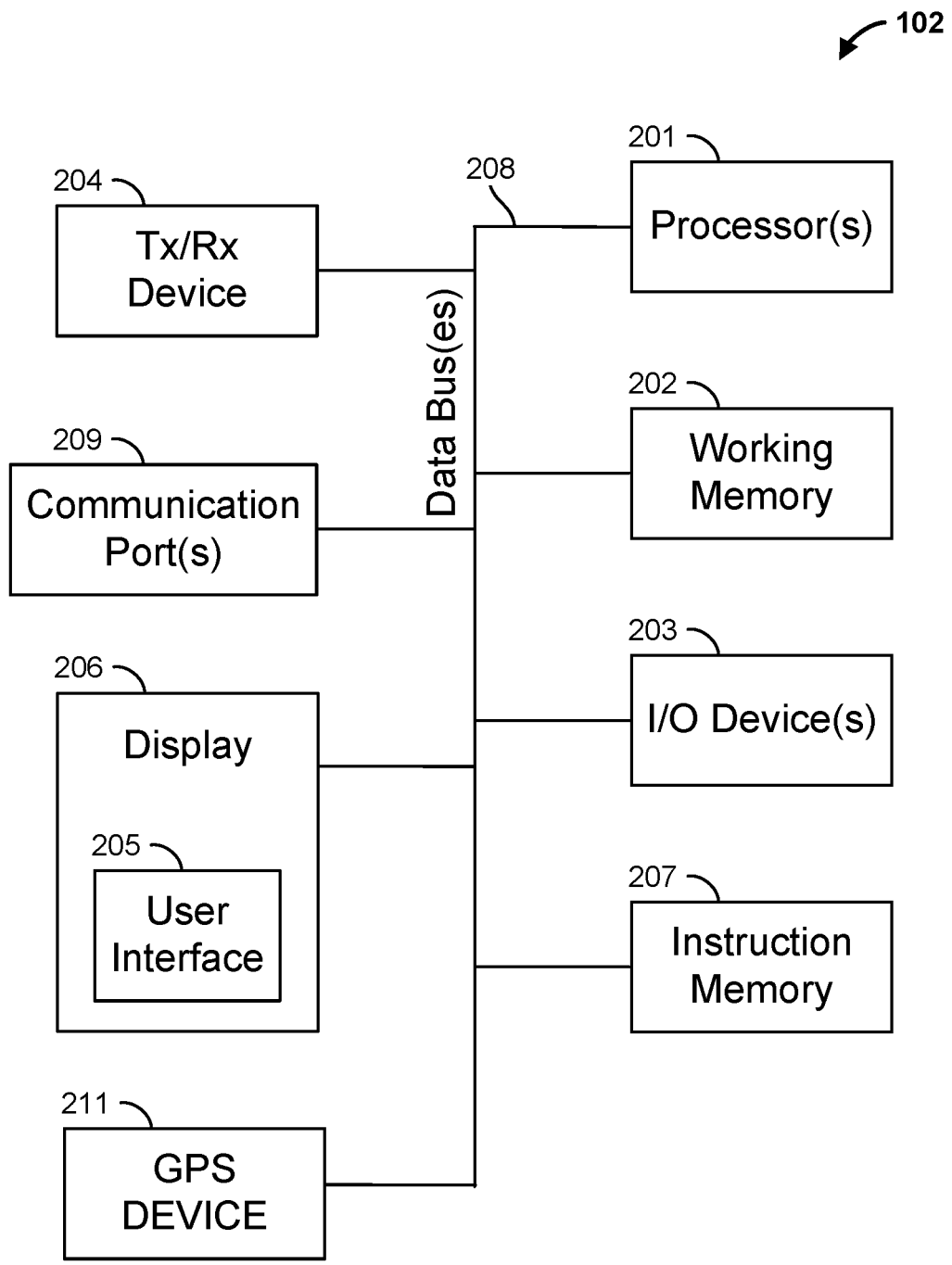
FIG. 2 is a block diagram of the item recommendation computing device of FIG. 1 in accordance with some embodiments.

FIG. 2 illustrates the item recommendation computing device 102 of FIG. 1. Item recommendation computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item recommendation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with item recommendation computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item recommendation computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, item recommendation computing device 102 may determine a local geographical area (e.g., town, city, state, etc.) of its position. Based on the geographical area, item recommendation computing device 102 may determine relevant trend data (e.g., trend data identifying events in the geographical area).

Figure 3:
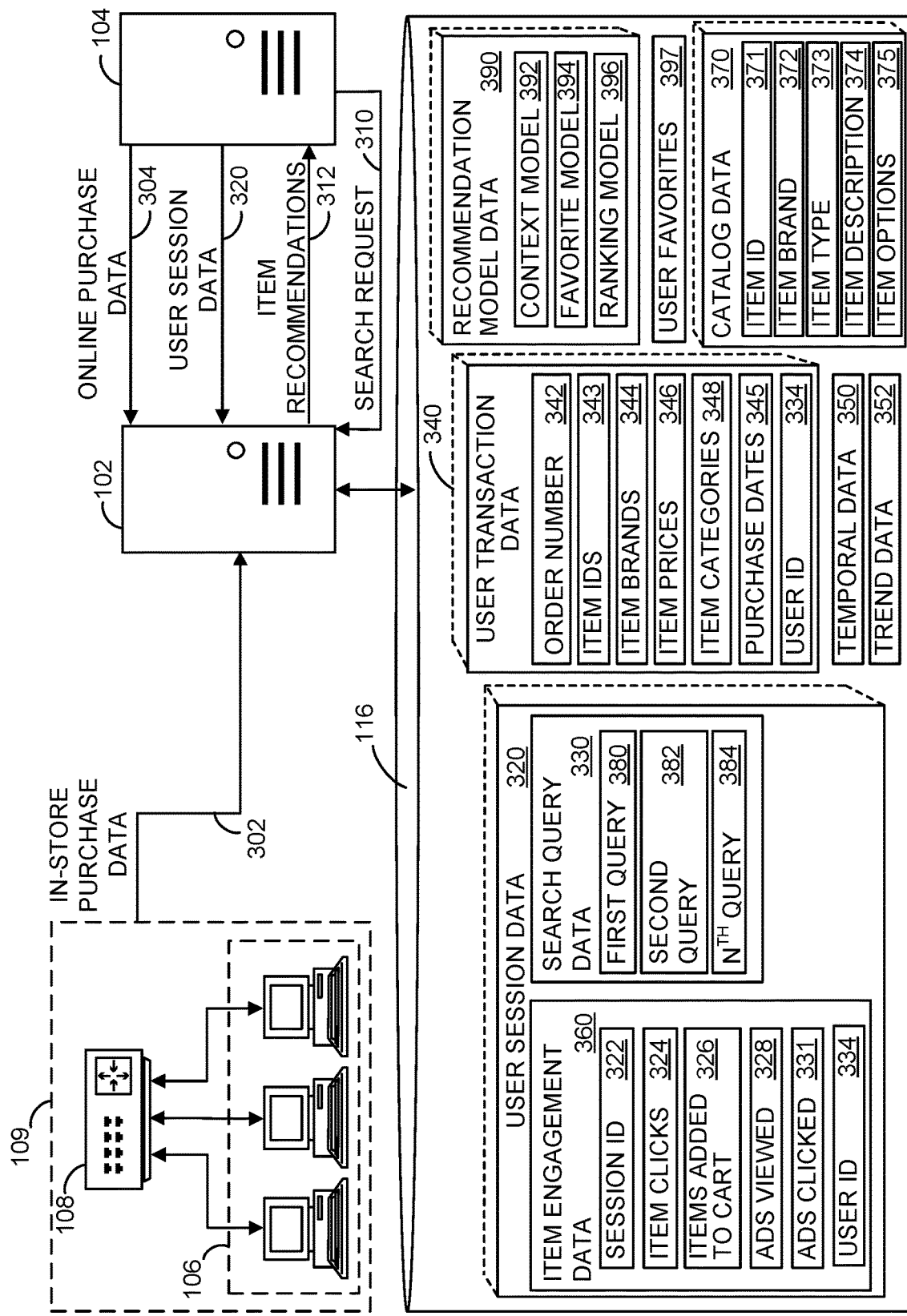
FIG. 3 is a block diagram illustrating various portions of the item recommendation system of FIG. 1 in accordance with some embodiments.

FIG. 3 is a block diagram illustrating examples of various portions of the item recommendation system 100 of FIG. 1. As indicated in the figure, item recommendation computing device 102 may receive user session data 320 from web server 104, and store user session data 320 in database 116. User session data 320 may identify, for each user (e.g., customer), data related to that user's browsing session, such as when browsing a retailer's webpage hosted by web server 104.

In this example, user session data 320 may include item engagement data 360 and/or search query data 330. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

Search query data 330 may identify one or more searches conducted by a user during a browsing session (e.g., a current browsing session). For example, item recommendation computing device 102 may receive a search request 310 from web server 104, where the search request 310 identifies one or more search terms provided by the user. Item recommendation computing device 102 may store the search terms as provided by the user as search query data 330. In this example, search query data 330 includes first query 380, second query 382, and $N^{th}$ query 384.

Item recommendation computing device 102 may also receive online purchase data 304 from web server 104, which identifies and characterizes one or more online purchases, such as purchases made by the user via a retailer's website hosted by web server 104. Item recommendation computing device 102 may also receive in-store purchase data 302 from store 109, which identifies and characterizes one or more in-store purchases.

Item recommendation computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item types 348 identifying a type (e.g., category) of each item purchased, a purchase date 345 identifying the purchase date of the purchase order, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

Database 116 may also store recommendation model data 390 identifying and characterizing one or more machine learning models. For example, recommendation model data 390 may include a context model 392, a favorite model 394, and a ranking model 396. Each of the a context model 392, a favorite model 394, and a ranking model 396 may be machine learning models trained based on corresponding tensors (e.g., embedding vectors, feature vectors) generated by item recommendation computing device 102.

Database 116 may further store temporal data 350 and trend data 352. Temporal data 350 may identify a current date (e.g., a date range), a current season (e.g., shopping season), or any other suitable time period. Trend data 352 may identify current events (e.g., local current events) such as sporting events, festivals, weather changes, seasonal changes, natural disasters. Temporal data 350 and trend data 352 may further help item recommendation computing device 102 determine user intent. For example, when a temporal data 350 for current user session matches a festival or holiday shopping season, the user intent may be determined to be holiday decorations when the current user session indicates user interaction with decorative items (e.g., ornaments, candles).

In some examples, database 116 may further store user favorites 397. User favorites 397 may include data indicating the first set of items that are determined to be the user's favorites based on the user transactional data 340 and/or user session data 320 associated with past user sessions, as determined prior to the current user session by favorite model 392.

In some examples, item recommendation computing device 102 receives (e.g., in real-time) user session data 320 for a customer interacting with a website hosted by web server 104. In response, item recommendation computing device 102 generates item recommendation 312 identifying recommended items to advertise to the customer, and transmits item recommendation 312 to web server 104.

For example, item recommendation computing device 102 may assign each of a context model 392, a favorite model 394, and a ranking model 396 (or parts thereof) to a different processing unit or virtual machines hosted by one or more processing devices 120. Moreover, item recommendation computing device 102 may generate tensors based at least on the received user session data 320 (e.g., the user session data 320 received in real-time) for the customer and the user transaction data 340 (e.g., the user transaction data 340 from prior or historical user sessions), as required by each of the context model 392, favorite model 394, and ranking model 396. In some examples, item recommendation computing device 102 generates the tensors based on the received user session data 320, and one or more of the following: historical user session data 320 for the customer, historical user transaction data 340 for the customer, temporal data 350, and trend data 352, for each of the context model 392, favorite model 394, and ranking model 396. Item recommendation computing device 102 may provide (e.g., transmit) the tensors to the processing units accordingly, and the processing units may execute the models based on the provided tensors (e.g., inferencing).

Further, item recommendation computing device 102 may obtain the output (e.g., output data, output tensors) of each of the context model 392, favorite model 394, and ranking model 396 from the processing units, and generate the item recommendation 312 based on the outputs of the models. For example, item recommendation computing device 102 may combine (e.g., merge) the outputs according to a merging or aggregation algorithm. The merging algorithm may, for example, re-ranks scores of the output of each model, performs a thresholding function on output of the favorite model, add portions of the output of the context model, and generate a ranking (e.g., item ranking) based on a combination of the model outputs. In some examples, the merging algorithm identifies and characterizes a deep learning model, such as a ranking model given a recall set, which takes the output of the other models (e.g., the output of the context model 392, favorite model 394, and ranking model 396) and provides a result set.

Figure 4:
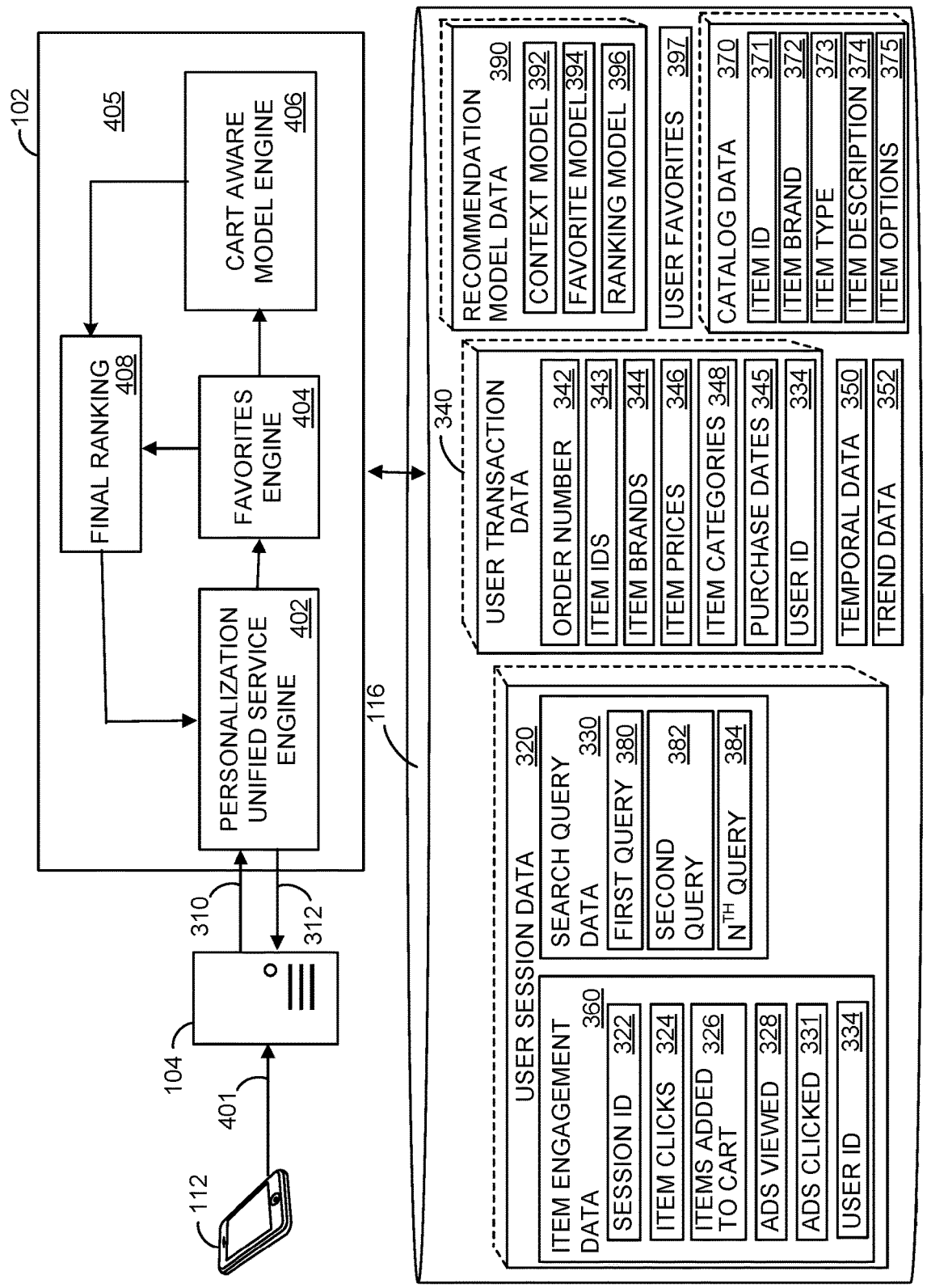
FIG. 4 is a block diagram illustrating various portions of the item recommendation computing device of FIG. 1 in accordance with some embodiments.

FIG. 4 is a block diagram illustrating a more detailed view of item recommendation computing device 102. Specifically, item recommendation computing device 102 includes includes personalization unified service engine 402, favorites engine 404, and cart aware model engine 406. In some examples, one or more of personalization unified service engine 402, favorites engine 404, and cart aware model engine 406 are implemented in hardware. In some examples, one or more of personalization unified service engine 402, favorites engine 404, and cart aware model engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain from database 116 search request 310 as an message 401 from user device 112 web server 104 and may execute recommendation model(s) included in the recommendation model data 390.

In this example, web server 104 transmits a search request 310 to item recommendation computing device 102. Search request 310 may include a request for item recommendations for presentation to a particular user using the user device 112. In some examples, search request 310 further identifies a user (e.g., customer) for whom the item recommendations are requested at web server 104. Personalization unified service engine 402 receives search request 310, and receives and parses the user session data 320 (e.g., user session data associated with a current user session of the user in real-time). Personalization unified service engine 402 provides to the favorites engine 404 the user session data 320, and other data, which may include the user transaction data 340, and user session data 320 (e.g., user session data from historical user sessions) extracted from database 116.

Favorites engine 404 can determine a first set of ranked items for recommendation based on the user session data 320 and the user transaction data 340. Favorites engine 404 may use favorite model 394 to determine the first set of ranked items based on the user's historical purchase and/or session data for the particular user of user device 112 extracted from the database 116 for the particular user. In some examples, favorites engine 404 may further use a thresholding algorithm to threshold the first set of ranked items to a predetermined number based on a number of favorite items after which the opportunity cost of presenting another favorite item as recommendation starts providing diminishing returns. Favorite engine 404 generates ranked first set of items for recommendation identifying and characterizing items determined to be favorites of the user based on historical user data and thresholded to prevent diminishing returns. Favorites engine 404 may provide the first set of ranked items (e.g., before or after thresholding) to cart aware model engine 406.

Cart aware model engine 406 can determine final ranking of items for recommendation based on user intent determined from the user session data 320 for the current user session. Cart aware model engine 406 may take as input items interacted or engaged with (e.g., items clicked on, items added to cart) by the user during the current user session. Cart aware model engine 406 can determine a second set of ranked items based on pre-trained embedding vectors and the user session data 320 for the current user session. Cart aware model engine 406 may also re-rank the first set of ranked items based on the user session data 320 of the current user session and the pre-trained embedding vectors. The re-ranked first set of items may then be ranked higher than the second set of ranked items. The second set of ranked items may be ranked in sequence after the re-ranked first set of items, and as such added to a queue for presentation in positions after the predetermined threshold number of items determined for the first set of ranked items. Cart aware model engine 406 may output final ranking 408 including re-ranked first set of items and the second set of ranked items ranked sequentially with the re-ranked first set of items ranked higher than the second set of ranked items. In some examples, cart aware model engine 406 may only rank second set of items for a number of second items that can fit into the total number of position available for recommendations after the re-ranked first set of items have been positioned first.

Final ranking 408 can determine an ordered list of the item recommendations 312 based on the final rankings received from the cart aware model engine 406. Final ranking 408 may generate data that identifies the order of item recommendations 312 associated with the particular user to optimize user interactions with and user purchases of items in the recommendations.

Personalization unified service engine 402 may receive the item recommendations 312 from the final ranking 408 in a data format (e.g., message) acceptable by web server 104. Personalization unified service engine 402 transmits the item recommendations 312 to web server 104. Web server 104 may then update or generate item recommendations for presentation to the user via the user device 112 based on the final ranking 408.

Figure 5:
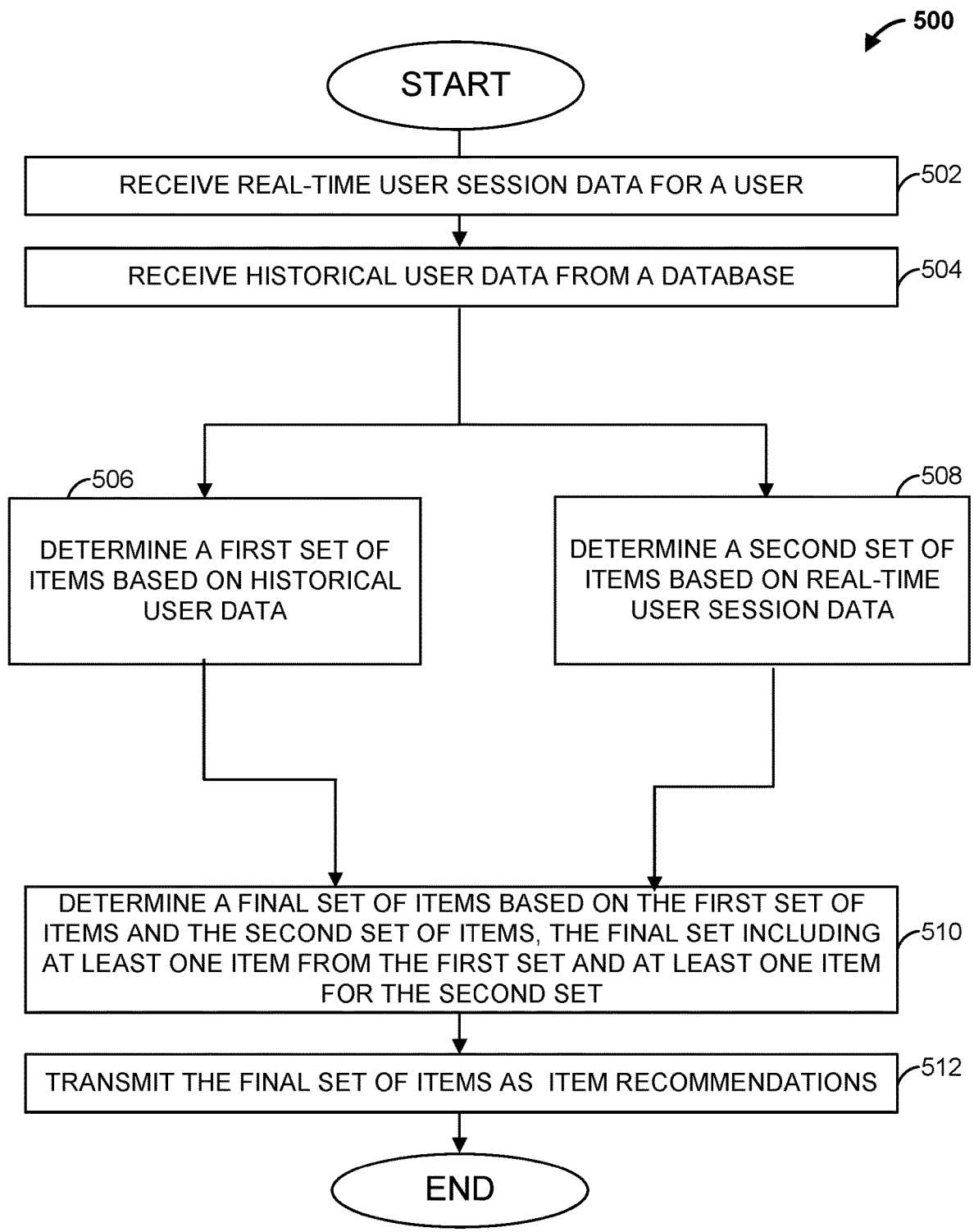
FIG. 5 is a flowchart of an example method that can be carried out by the item recommendation computing device of FIG. 1 in accordance with some embodiments.

FIG. 5 is a flowchart of an example method 500 that can be carried out by a computing device, such as the item recommendation computing device 102 of FIG. 1. Beginning at step 502, real-time user session data for a user is received. For example, item recommendation computing device 102 may receive user session data 320 for a user from web server 104. At step 504, historical user data for the user is received. For example, item recommendation computing device 102 may obtain the historical user session data and/or historical user transaction data for the user from database 116, which stores historical user session data and historical user transaction data for a plurality of users.

The method then proceeds to steps 506 and 508. At step 506, a first set of items for recommendation are determined based on the historical user data. For example, favorites engine 404 may generate a first set of ranked items based on historical user data received from database 116. At step 508, a second set of items for recommendation are determined based on the real-time user session data for the user. For example, cart aware model engine 406 may determine a second set of ranked items based on current user session data 320 based on determining one or more user intents for the current user session.

From steps 506 and 508, the method proceed to step 510, where a final set of items for recommendation (i.e., one or more item recommendations) is determined based on the first set of items and the second set of items. The final set of items includes at least one item from the first set of items and at least one item from the second set of items. For example, item recommendations 312 may be generated by cart aware model engine 406 based on the first set of ranked items and the second set of ranked items. At step, 512, the final set of items may be transmitted as item recommendations. For example, item recommendation computing device 102 may transmit the item recommendations 312 to web server 104 for presentation to the user via user device 112. The method then ends.

Figure 6:
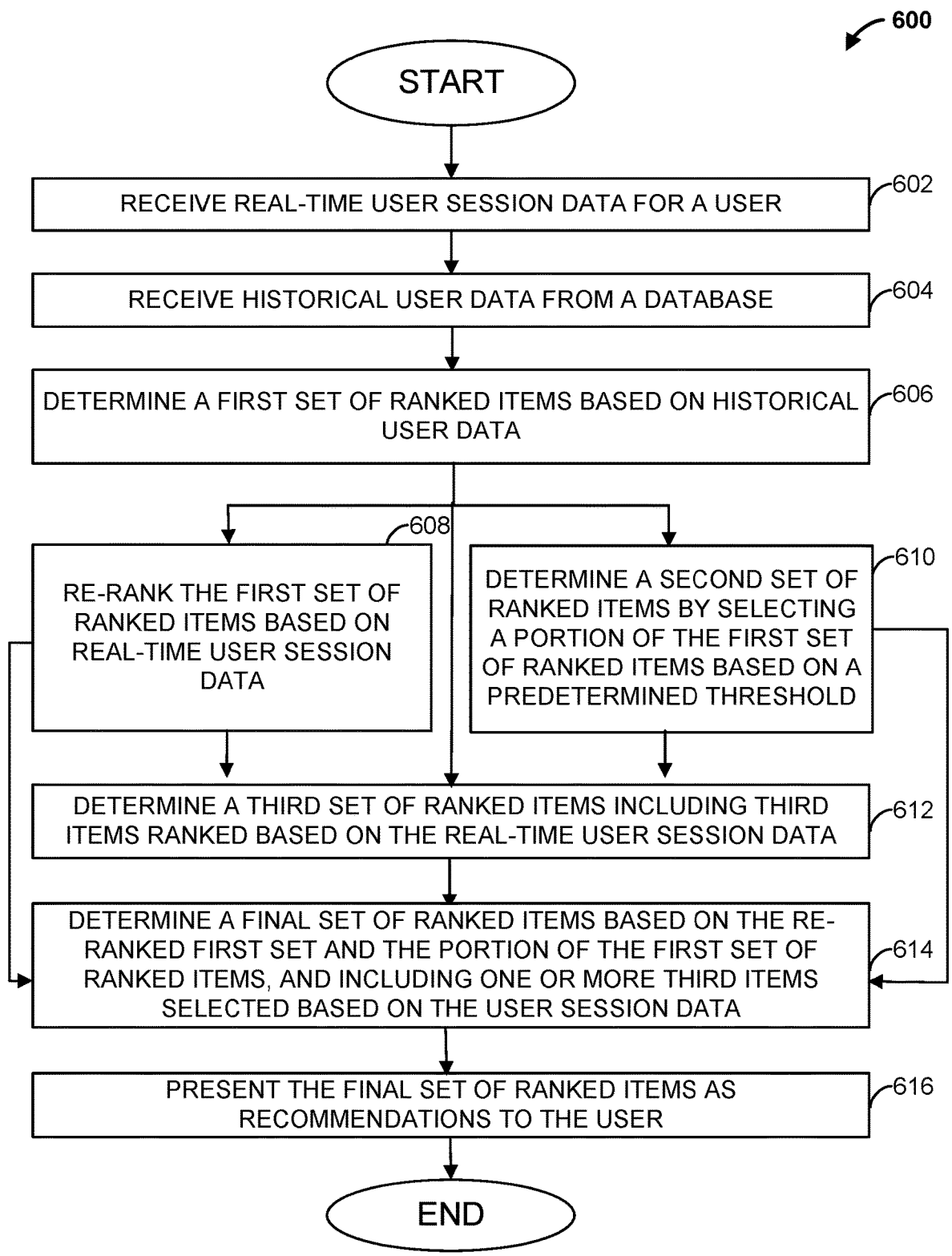
FIG. 6 is a flowchart of another example method that can be carried out by the item recommendation computing device of FIG. 1 in accordance with some embodiments.

FIG. 6 is a flowchart of an example method 600 that can be carried out by a computing device, such as the item recommendation computing device 102 of FIG. 1. Beginning at step 602, real-time user session data for a user is received. For example, item recommendation computing device 102 may receive user session data 320 for a user from web server 104. At step 604, historical user data for the user is received. For example, item recommendation computing device 102 may obtain the historical user session data and/or historical user transaction data for the user from database 116, which stores historical user session data and historical user transaction data for a plurality of users. At step 606, a first set of ranked items for recommendation are determined based on the historical user data. For example, favorites engine 404 may generate a first set of ranked items based on historical user data received from database 116.

The method then proceeds to steps 608, and 610 which may be performed simultaneously (or nearly simultaneously, as allowed by CPU and GPU processing). At step 608, the first set of ranked items are re-ranked based on the real-time user session data. For example, cart aware model engine 406 may re-rank the first set of ranked items based on the current user session (e.g., based on perceived user intent(s)). At step 610, a second set of ranked items is determined by selecting a portion of the first set of ranked items based on a predetermined threshold. For example, favorites engine 404 may select a portion of the first set of ranked items based on a predetermined threshold selected such that presenting any more of the items in the first set of ranked items provides a diminishing return.

From steps 606, 608, and 610, the method proceed to step 612, where a third set of ranked items including third items ranked based on the real-time user session are determined. For example, cart aware model engine 406 may determine a second set of ranked items based on embedding vectors of user and items, and the current user session 320, for example, based on the perceived user intent(s). In some examples, the third items may be different from items in the first set of ranked items.

At step 614, a final set of ranked items (i.e., one or more item recommendations) is determined based on the re-ranked first set and the portion of the first set of ranked items, and including one or more third items selected based on the user session data. For example, final ranking 408 may be determined based on re-ranked first set of items, thresholded first set of items, and include at least one item from a second set of items determined based on the current user session data 320.

At step 616, the final set of ranked items may be presented to the user as recommendations. For example, item recommendation computing device 102 may transmit the item recommendations 312 to web server 104 for presentation to the user via user device 112. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a non-transitory memory having instructions stored thereon; and
 a processor configured to read the instructions to:
  receive, from a user device, a search request including a user identifier associated with the search request, wherein the search request is generated during a current session;
  receive user session data identifying one or more activities of the user from one or more servers, wherein the user session data is associated with the current session, and wherein the one or more activities are representative of interactions between the user device and the one or more servers;
  receive historical user data associated with the user from a database;
  generate a first set of embeddings based on the historical user data;
  implement a trained favorite model to generate a first set of items from a plurality of items based on the first set of embeddings, wherein the trained favorite model is configured to apply a logit function to perform a pairwise comparison of each item in the plurality of items;
  generate user intent for the current session based at least in part on the user session data, wherein the user intent is based at least in part on a set of items associated with the current user session;
  generate a second set of embeddings based on the user session data;
  train a context model based on pre-trained user embeddings and item embeddings, wherein the user embeddings are representative of a plurality of users during historical user sessions and the item embeddings are representative of items paired together during a corresponding historical user session;
  implement the trained context model to generate a second set of items from the plurality of items based on the second set of embeddings and the user intent, the second set of items being different from the first set of items, and wherein the trained context model is configured to receive a data triplet including an embedding selected from the second set of embeddings and pre-trained feature embeddings associated with each of a first item and a second item;
  implement a ranking model to generate a third set of items by re-ranking a combination of the first set of items and the second set of items, the third set of items including at least one item from the first set of items and at least one item from the second set of items, wherein the third set of items are determined by a trained ranking model configured to receive the first set of embeddings and the second set of embeddings; and
  generate a user interface including the third set of items, wherein the user interface is presented via the user device.

2. The system of claim 1, wherein the historical user data includes user interaction data and user transaction data during prior user sessions.

3. The system of claim 1, wherein the third set of items include a predetermined number of items including a threshold number of items from the first set of items and a remainder of the predetermined number of items from the second set of items.

4. The system of claim 3, wherein the threshold number of items from the first set of items is determined based on an opportunity cost of including another item from the first set of items being associated with diminishing returns.

5. The system of claim 1, wherein the processor is further configured to:
 determine a threshold number of items from the first set of items to include in the third set of items based on a diminishing returns algorithm;
 determine a subset of the re-ranked first set of items based on the threshold number of items; and
 determine the third set of items as including at least the subset of the re-ranked first set of items.

6. The system of claim 5, wherein the first set of items are re-ranked using pre-trained user and item embeddings generated based on historical user data associated with a plurality of users.

7. The system of claim 1, wherein the processor is further configured to transmit the third set of items to the user such that the at least one item from the first set of items is transmitted to be presented at a higher position than the at least one item from the second set of items.

8. The system of claim 1, wherein the second set of items are determined based on likelihood of the corresponding items being bought together with session items interacted with during the user session by the user.

9. A computer-implemented method executed by a processing unit comprising:
- receiving, from a user device, a search request including a user identifier associated with the search request, wherein the search request is generated during a current session;
- receiving user session data identifying one or more website activities of the user from one or more servers, wherein the user session data is associated with the current session, and wherein the one or more activities are representative of interactions between the user device and the one or more servers;
- receiving historical user data associated with the user from a database;
- generating a first set of embeddings based on the historical user data;
- implementing a trained favorite model to generate a first set of items from a plurality of items based on the first set of embeddings, wherein the trained favorite model is configured to apply a logit function to perform a pairwise comparison of each item in the plurality of items;
- generating user intent for the current session based at least in part on the user session data, wherein the user intent is based at least in part on a set of items associated with the current user session;
- generating a second set of embeddings based on the user session data;
- training a context model based on pre-trained user embeddings and item embeddings, wherein the user embeddings are representative of a plurality of users during historical user sessions and the item embeddings are representative of items paired together during a corresponding historical user session;
- implementing the trained context model to generate a second set of items from the plurality of items based on the second set of embeddings and the user intent, the second set of items being different from the first set of items, and wherein the trained context model is configured to receive a data triplet including an embedding selected from the second set of embeddings and pre-trained feature embeddings associated with each of a first item and a second item;
- implementing a ranking model to generate a third set of items by re-ranking a combination of the first set of items and the second set of items, the third set of items including at least one item from the first set of items and at least one item from the second set of items, wherein the third set of items are determined by a trained ranking model configured to receive the first set of embeddings and the second set of embeddings; and
- generating a user interface including the third set of items, wherein the user interface is presented via the user device.

10. The method of claim 9, wherein the historical user data includes user interaction data and user transaction data during prior user sessions.

11. The method of claim 9, wherein the third set of items includes a predetermined number of items for recommendation including a threshold number of items from the first set of items and a remainder of the predetermined number of items from the second set of items.

12. The method of claim 11, wherein the threshold number of items from the first set of items is determined based on an opportunity cost of including another item from the first set of items being associated with diminishing returns.

13. The method of claim 9, the method further comprising:
- determining a threshold number of items from the first set of items to include in the third set of items based on a diminishing returns algorithm;
- determining a subset of the re-ranked first set of items based on the threshold number of items; and
- determining the third set of items as including at least the subset of the re-ranked first set of items.

14. The method of claim 13, wherein the first set of items are re-ranked using pre-trained user and item embeddings generated based on historical user data associated with a plurality of users.

15. The method of claim 9, the method further comprising transmitting the third set of items to the user such that the at least one item from the first set of items is transmitted to be presented at a higher position than the at least one item from the second set of items.

16. The method of claim 9, wherein the second set of items are determined based on likelihood of the corresponding items being bought together with session items interacted with during the user session by the user.

17. A non-transitory computer readable medium having instructions stored thereon, wherein the instructions, when executed by at least one processor, cause a device to perform operations comprising:
- receiving, from a user device, a search request including a user identifier associated with the search request, wherein the search request is generated during a current session;
- receiving user session data identifying one or more website activities of the user from one or more servers, wherein the user session data is associated with the current session, and wherein the one or more activities are representative of interactions between the user device and the one or more servers;
- receiving historical user data associated with the user from a database;
- generating a first set of embeddings based on the historical user data;
- implementing a trained favorite model to generate a first set of items from a plurality of items based on the first set of embeddings, wherein the trained favorite model is configured to apply a logit function to perform a pairwise comparison of each item in the plurality of items;
- generating user intent for the current session based at least in part on the user session data, wherein the user intent is based at least in part on a set of items associated with the current user session;
- generating a second set of embeddings based on the user session data;
- training a context model based on pre-trained user embeddings and item embeddings, wherein the user embeddings are representative of a plurality of users during historical user sessions and the item embeddings are representative of items paired together during a corresponding historical user session;
- implementing the trained context model to generate a second set of items from the plurality of items based on the second set of embeddings and the user intent, the second set of items being different from the first set of items, and wherein the trained context model is configured to receive a data triplet including an embedding selected from the second set of embeddings and pre-trained feature embeddings associated with each of a first item and a second item;

implementing a ranking model to generate a third set of items by re-ranking a combination of the first set of items and the second set of items, the third set of items including at least one item from the first set of items and at least one item from the second set of items, wherein the third set of items are determined by a trained ranking model configured to receive the first set of embeddings and the second set of embeddings; and generating a user interface including the third set of items, wherein the user interface is presented via a user device.

18. The non-transitory computer readable medium of claim 17 having instructions stored thereon, wherein the instructions, when executed by the at least one processor, further cause the device to perform operations comprising:

re-ranking the first set of items based on the user session data;

determining a threshold number of items from the first set of items to include in the third set of items based on a diminishing returns algorithm;

determining a subset of the re-ranked first set of items based on the threshold number of items; and determining the third set of items as including at least the subset of the re-ranked first set of items.

19. The system of claim 4, wherein the session data includes a number of items added to a cart, and wherein the opportunity cost is determined based on the number of items added to the cart for the current session.

20. The method of claim 12, wherein the session data includes a number of items added to a cart, and wherein the opportunity cost is determined based on the number of items added to the cart for the current session.

* * * * *